United States Patent [19]

Min

[11] Patent Number: 5,202,819
[45] Date of Patent: Apr. 13, 1993

[54] CAPACITOR INPUT TYPE RECTIFIER HAVING A CIRCUIT FOR PREVENTING INRUSH CURRENT

[75] Inventor: Kyeongseol Min, Suwon, Rep. of Korea

[73] Assignee: Samsung Electronics Co., Ltd., Kyunggi, Rep. of Korea

[21] Appl. No.: 863,027

[22] Filed: Apr. 3, 1992

[30] Foreign Application Priority Data

Jun. 13, 1991 [KR] Rep. of Korea .................. 91-9764

[51] Int. Cl.⁵ .................... H01G 9/16; H02P 13/24
[52] U.S. Cl. .............................. 361/436; 363/86
[58] Field of Search .................. 361/436; 321/18, 19; 323/243, 300; 363/49, 86, 37, 54

[56] References Cited

U.S. PATENT DOCUMENTS

| | | | |
|---|---|---|---|
| 4,321,662 | 3/1982 | Yokoyama | 363/86 |
| 4,328,459 | 5/1982 | McLeod | 323/300 |
| 4,376,968 | 3/1983 | Wueschinski et al. | 363/37 |
| 4,689,548 | 8/1987 | Mechlenburg | 323/243 |

*Primary Examiner*—Donald Griffin
*Attorney, Agent, or Firm*—Watson, Cole, Grindle & Watson

[57] ABSTRACT

A capacitor input type rectifier having a circuit for preventing an inrush current uses an AC phase detector for detecting the time that an AC voltage input has the smallest phase angle and provides an output signal indicative thereof to a phase control rectifier for initiating rectification of the AC voltage to provide a rectified output to a smoothing circuit for smoothing the rectified output of the phase control rectifier.

3 Claims, 2 Drawing Sheets

AC

FIG.3B +15V
TRN1 OUTPUT
−15V

R3,Vref

OP AMP OUTPUT
0°    180°   360°

CAPACITOR INPUT TYPE RECTIFIER HAVING A CIRCUIT FOR PREVENTING INRUSH CURRENT

FIELD OF THE INVENTION

This invention relates to a capacitor input type rectifier having a circuit for preventing or reducing inrush current, and more particularly to a capacitor input type rectifier having a circuit for preventing or minimizing inrush current by applying power when the input current becomes a minimum by detecting the phase of an AC voltage at the time of applying the AC power.

RELATED ART

A rectifier is a circuit for converting an AC current into a DC current. Rectifier circuits are classified as full-wave rectifiers and half-wave rectifiers according to the rectifying method; and into a capacitor input type, a choke input type, a phi ($\pi$) input type, and the like, according to the smoothing function. The DC output which is output from the rectifying circuit has a ripple component and thus a voltage regulation of the DC output is necessary, such that a smoothing circuit following the rectifying circuit is required to remove this unbalance and output a smooth DC with no ripple component or oscillations.

With respect to such smoothing circuits, there is a capacitor input type in which a capacitor is directly connected into an output portion of the rectifying circuit; a choke input type in which the capacitor is connected after the choke is connected into an output portion of the rectifying circuit; and a phi ($\pi$) input type in which the above two types are combined.

The capacitor input type has a high voltage at the time of outputting DC and has a small ripple component. However, it has the disadvantage that an inrush current flows when the circuit is started.

However, the choke input type has a low voltage unlike the capacitor input type at the time of outputting the DC signal. But since it has advantages in that the voltage regulation is low and the amount of the inrush current is small, generally it is used for a large current circuit.

FIG. 1 shows a conventional rectifier of the capacitor input type with rectifying block 2 connected to an AC voltage source 1, and a smoothing block 3 is connected to an output terminal of the above-mentioned rectifying block 2. The rectifying block 2 is a bridge rectifying circuit formed by four diodes. The smoothing block 3 is constituted by a thermistor TH1 connected to the output terminal of the rectifying block 2, and an input type capacitor C1 connected to the above-mentioned thermistor TH1.

An operation of the conventional rectifier of the capacitor input type according to the above-mentioned construction is as follows. If the switch SW of the AC voltage source 1 is closed (turned ON), and the voltage of the AC voltage source is applied to a bridge rectifying circuit 2, then the AC voltage is rectified by the bridge rectifying circuit 2. The voltage rectified by the bridge rectifying circuit 2 is a pulsating voltage. If a pulsating voltage is applied to the thermistor TH1 of the smoothing block 3 the small amount of the pulsating voltage is applied to the input type capacitor C1 by a voltage drop through the thermistor TH1 and then is smoothed by the input type capacitor C1. If the resistance value of the thermistor TH1 becomes gradually small, because of a temperature rise in accordance with the power dissipation of the thermistor TH1, the voltage drop across the thermistor TH1 becomes small and a large amount of the pulsating voltage is smoothed by the input type capacitor C1. In the case where the temperature of the thermistor Th1 rises and the resistance value of the thermistor TH1 becomes small, if the switch SW1 is closed (turned off) and immediately is turned ON the resistance of the thermistor TH1 remains small and so a large amount of inrush current due to an initial momentary short flows through the input type capacitor C1. Accordingly, to prevent the inrush current, as just described, and only when the resistance value of the thermistor TH1 restores to an original state, is the switch SW turned ON.

As explained above, in the capacitor input type rectifier of the prior art, a power type thermistor was added to an output portion of the rectifying circuit to prevent the inrush current. A thermistor represents a thermally sensitive resistor such that the resistance value varies in accordance with the temperature variation. There is a negative temperature characteristic thermistor wherein the resistance value drops in accordance with a temperature rise, and to the contrary, a positive temperature characteristic thermistor in which the resistance value rises in accordance with the temperature rise. Generally, the thermistor that is used has a negative temperature characteristic. Accordingly, if such a thermistor is used, the AC voltage is rectified before being input into the smoothing circuit, and an initial voltage drop across the thermistor occurs. Gradually, the temperature of the thermistor rises because of the heat generated by the resistance of the thermistor, and the resistance value of the thermistor falls. As a result of that, the inrush current caused by the initial momentary short of the input type capacitor can be prevented to a certain extent.

However, the above-described conventional capacitor input type rectifier has the following disadvantages. After the capacitor input type rectifier operates normally, if the supply of the AC voltage is suspended and the supply of the AC voltage is immediately begun, the resistance value of the thermistor remains small, because the temperature of the thermistor does not drop quickly. Accordingly, the inrush current caused by the initial momentary short of the input type capacitor can not be prevented. Therefore, there is an inconvenience in that an input type capacitor having a rated capacity is not able to prevent the inrush current.

SUMMARY OF THE INVENTION

A primary object of the invention is to provide a capacitor input type rectifier having a circuit for preventing or minimizing an inrush current generated by initiation of rectification.

It is another object of the present invention to provide a capacitor input type rectifier having a circuit for preventing a inrush current which improves product reliability by preventing the breakdown of parts due to the flow of a sudden inrush current.

To accomplish the above objects, the present invention is constituted by an Ac voltage source; a phase detection circuit is connected to the above the AC voltage source and detects the phase of the AC power supply; a rectifying circuit is connected to the phase detection circuit and rectifies the AC voltage according to the output of the phase detection circuit; and a smoothing circuit connected to the rectifying circuit is and smoothes the output of the rectifying circuit.

BRIEF DESCRIPTION OF THE DRAWINGS

The above objects, advantages and features of the invention are believed to be readily apparent from the following description of a preferred embodiment of the best mode of carrying out the invention when taken in conjunction with the following drawings, wherein.

Throughout the figures the same reference numerals are applied to identical components.

DESCRIPTION OF THE PREFERRED EMBODIMENT

Figure 1:
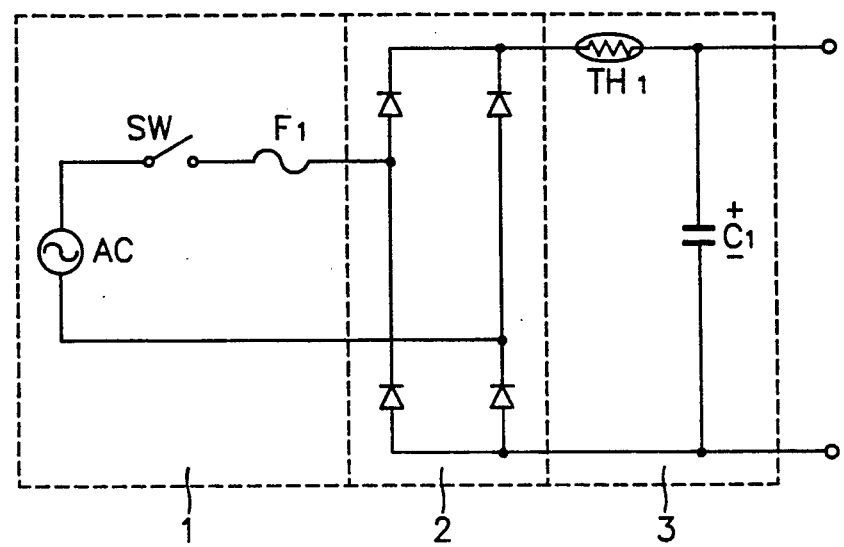
FIG. 1 is a circuit diagram showing a prior art capacitor input type rectifier.
Figure 2:
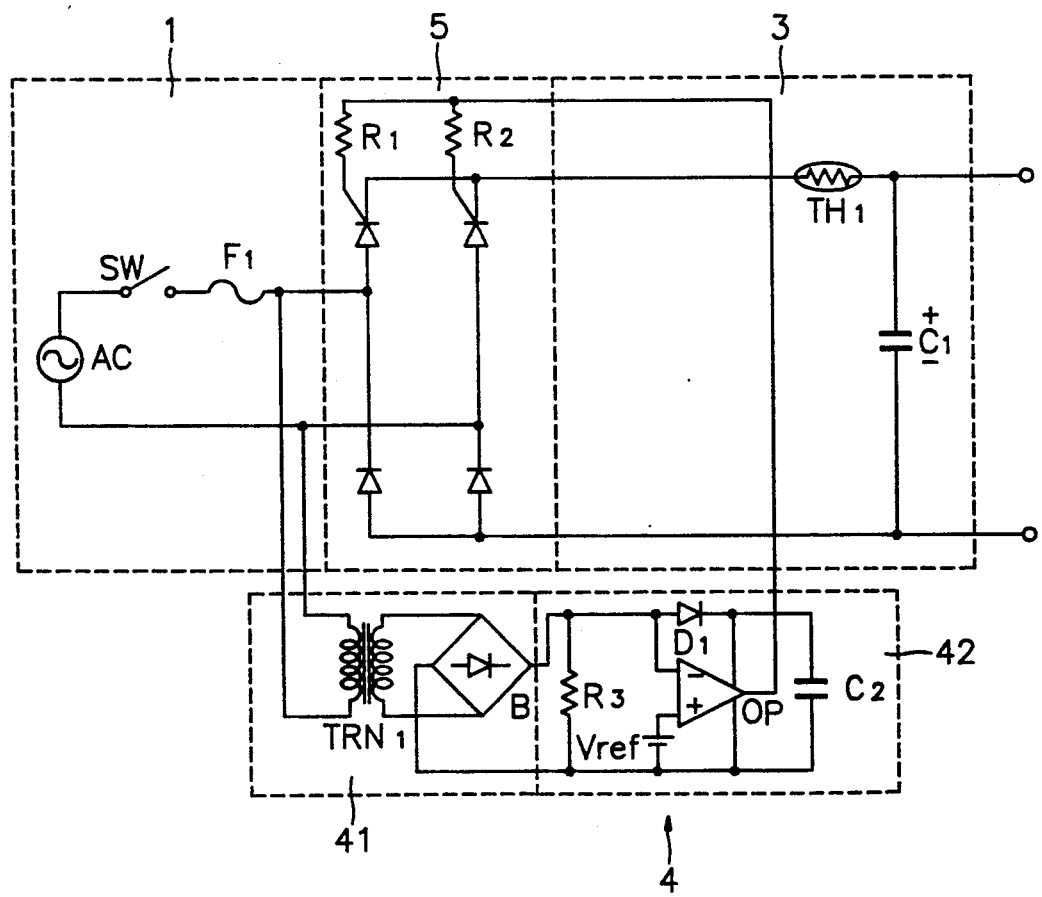
FIG. 2 is a detailed circuit diagram illustrating a capacitor input type rectifier according to the present invention having a circuit for preventing inrush current.

FIG. 2 is a detailed circuit diagram showing a capacitor input type rectifier having a circuit for preventing inrush current according to a preferred embodiment of the present invention. As shown in FIG. 2, a capacitor input type rectifier having a circuit for preventing inrush current comprises: an AC voltage source 1; a phase detection circuit 4 for detecting the phase of an AC voltage with the input terminals thereof connected to an output of the AC voltage source 1; a phase control rectifying circuit 5, the input terminals of which are connected to the output terminals of the AC voltage source 1 and the phase detection circuit 5 for detecting the AC voltage; and a smoothing circuit 3 the input terminals of which are connected to an output terminal of the phase control rectifying circuit 5.

The AC voltage source 1 comprises an AC voltage source; a switch SW with one side terminal connected to the AC voltage source; and a fuse F1 with one side terminal connected to the other side of the switch SW.

Also, the phase detection circuit 4 for detecting the AC voltage comprises a transformation rectifying section 41 connected to the AC voltage source 1 and which outputs a rectified voltage after transforming the AC voltage into DC voltage; and a comparing section 42 connected to the transformation rectifying section 41, and which compares the output voltage of the transformation rectifying section 41 with a reference voltage and outputs the result thereof into rectifying block 41.

The transformation rectifying section 41 comprises a transformer TRN1 with a first coil connected to the output terminal of the AC voltage block 1; and a bridge rectifying circuit with an input terminal is connected to the second coil of the transformer TRN1.

And the comparing section 42 comprises; a resistor R3 connected between the output terminals of the transformation rectifying section 41; an operational amplifier OP with a noninverting terminal connected to a reference voltage Vref, and an inverting terminal connected to the output terminal of the transformation rectifying section 41; a diode D1 which an anode connected to the inverting terminal of the operational amplifier OP; a capacitor C2 connected between a cathode of the diode D1 and a ground terminal of the operational amplifier OP.

In the embodiment of the present invention, a bridge rectifying circuit is used as a transformation rectifying section, however, such use is for purposes of description and it is to be understood that the invention is not limited to the specific bridge rectifying circuit described herein.

Additionally, a phase control rectifying circuit 5 comprises: a bridge rectifying circuit consisting of two diodes and two silicon controlled rectifiers (SCRs); resistors R1, R2 respectively connected to gate terminals of the SCR. The above SCR is a rectifying element having a property that once the SCR is turned ON, and if the current flowing in the SCR is kept at more than the cut in current, the SCR is conditioned to be turned ON, regardless of the existence or non-existence of the gate current, and if the SCR is conditioned to be turned OFF, the gate signal is restored to control the SCR A smoothing circuit 3 consists of; a thermistor TH1 with one side terminal connected to the output of a phase control rectifying circuit 5; and a capacitor C1 connected between the other terminal of the thermistor TH1 and ground.

The operation of a capacitor input type rectifier having a circuit for preventing inrush current according to the embodiment of the present invention embodied as described above is as follows.

Figure 3A:
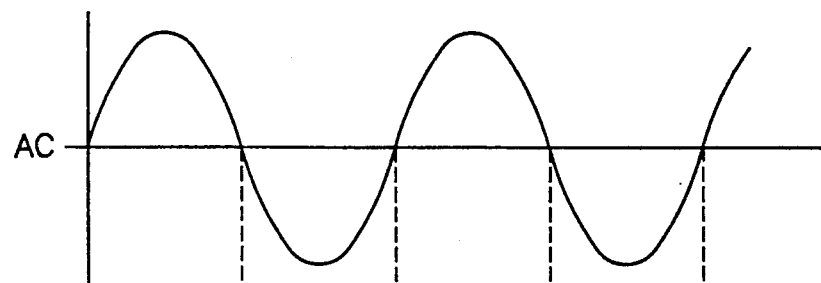
FIG. 3 is a waveform chart of the phase detection circuit for detecting the phase of an AC voltage according to an embodiment of the present invention.

If the voltage of an AC voltage source is assumed to have the waveform as shown FIG. 3A is input to the transformer TRN1 of a transformation rectifying section 41, the transformer TRN1 transforms the AC voltage into a low voltage of 15 V, and then outputs the transformed voltage to a bridge rectifying circuit B. FIG. 3B illustrates the voltage transformed by transformer TRN1.

If the voltage having the waveform shown in FIG. 3B and transformed into a +15 V DC output is applied to the bridge rectifying circuit B, the applied voltage is rectified by the bridge rectifying circuit B to produce a pulsating voltage which is then applied to resistor R3 of a comparing section 42. If the pulsating voltage is applied to the resistor R3, the diode D1 is turned ON. And as the capacitor C2 is charged, the power is supplied to the operational amplifier OP, and thus the operational amplifier OP is operated. The voltage applied to the resistor R3 is compared with a reference voltage Vref, and in the situation where the voltage applied to the resistor R3 is lower than the reference voltage Vref, a pulse is output from an operational amplifier OP.

Figure 3C:
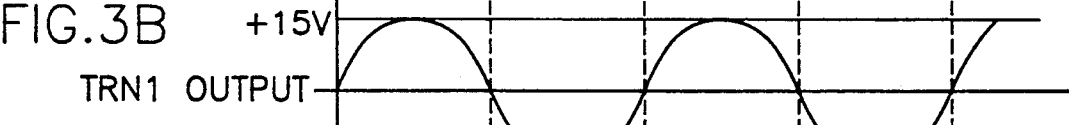
Figure 3C:
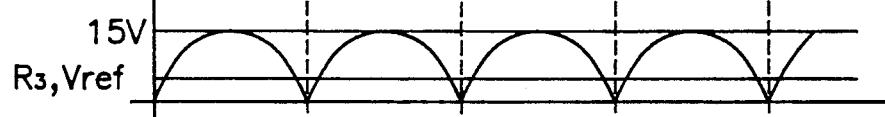

FIG. 3C shows a pulsating voltage applied to a resistor R3, and a reference voltage Vref is input to an operational amplifier OP. In the embodiment of the present invention, a reference voltage Vref is 2.5 V; however, the technical scope of the present invention is not limited to this voltage and the reference voltage Vref can be varied in order to precisely detect the phase of an AC voltage.

Figure 3D:
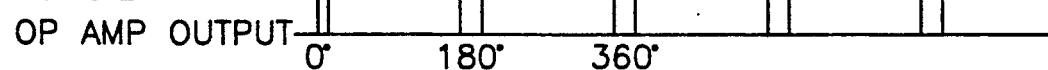

Also, FIG. 3D shows the output signal of operational amplifier OP. If the SCR of the phase control rectifying circuit 5 is turned ON by the output signal of the operational amplifier OP having the waveform of FIG. 3D, the voltage signal of the AC voltage of the AC voltage source 1 starts to be rectified. If the voltage signal of the AC voltage decreases so that the SCR o the phase control rectifying circuit 5 is turned OFF, the output signal of the phase detection circuit 4 for detecting the AC voltage turns ON the SCR of the phase control rectifying circuit 5. As a result, the voltage of the AC voltage is rectified continuously.

The output signal of the rectified pulsating voltage of the phase control rectifying circuit 5 is output to the smoothing circuit 3, the pulsating voltage is smoothed by the capacitor C1 of the smoothing circuit 3.

As shown in FIG. 2, the comparing section 42 of the phase detection circuit 4 for detecting the AC voltage outputs the pulsating signal, and so makes the SCR of the phase control rectifying circuit 5 turn ON when the voltage value of a sine wave signal, the AC voltage is the smallest phase, namely, when the phase angles are 0, 180, 360 and 540 degrees. Accordingly, only when the AC voltage of the AC voltage source is the smallest is the phase control rectifying circuit 5 allowed to operate. Thus, the inrush current caused by the initial sudden short of the input type capacitor C1 of the smoothing circuit 3 can be minimized.

As explained herein, the capacitor input type rectifier having an effect of preventing an inrush current caused by the initial sudden shorting of the input type capacitor can be provided by starting to rectification, when the AC voltage is the smallest in the embodiment of the present invention. The effect achieved by the present invention can be applied to all power supply circuits using capacitor input type rectifying and smoothing circuitry.

The above description is presented solely for the purpose of describing the invention and those skilled in the rectifier art will readily recognize modifications, alterations and changes to the structure described herein without departing from the spirit and scope of the invention which is too be determined by the appended claims and the equivalents to which the claimed invention is entitled.

What is claimed is:

1. A capacitor input type rectifier having a circuit for preventing an inrush current, comprising:
   an AC phase detector for detecting a phase of the time that an AC voltage input is the smallest and for providing an output signal indicative thereof;
   a phase control rectifier having a control terminal connected to said AC phase detector for initiating rectification for the AC voltage input according to the output signal of said AC phase detector; and
   means for smoothing connected to said phase control rectifier for smoothing the output of said phase control rectifier.

2. A capacitor input type rectifier as claimed in claim 1, wherein said AC phase detector includes a transformation rectifying means having output terminals for transforming and rectifying said AC voltage and a comparing means for comparing the output signal of said transformation rectifying means with a reference voltage and detecting the phase of the smallest magnitude of AC voltage.

3. A capacitor input type rectifier as claimed in claim 2, wherein said means for comparing includes a resistor connected between the output terminals of said transformation rectifying means, an operational amplifier having a noninverting terminal connected to a reference voltage and an inverting terminal connected to the output terminal of said transformation rectifying means, a diode having an anode connected to the inverting terminal of said operational amplifier, and a capacitor connected between the cathode of said diode and ground.

* * * * *